INVENTOR.
John A. Knox

ATTORNEY. Paul H. Leonard

United States Patent Office 3,319,714
Patented May 16, 1967

3,319,714
WELL ACIDIZING METHOD
John A. Knox, Duncan, Okla., assignor to Halliburton Company, Duncan, Okla., a corporation of Delaware
Filed Sept. 25, 1964, Ser. No. 399,251
15 Claims. (Cl. 166—42)

The present invention relates to a new and improved method of acidizing wells and more particularly to a well acidizing method utilizing a chemically retarded acid.

The present invention is especially directed to a method of chemically retarding the reaction of hydrochloric acid on calcareous formations or earth formations suitable for treatment with well acidizing acids.

Limestone, dolomite and other formations containing gas, oil or water are often treated with acid to increase the productivity of such minerals from the underground reservoir. The acid may act in several ways. First, the acid often removes any plugging material from vugs or naturally occurring fractures by a reaction with the contaminant or the surrounding calcareous earth formations. Secondly, the action of the acid likely increases the size of natural occurring vugs or fractures. Thirdly, the introduction of the acid itself may create fractures, with the acid acting to etch such fractures so that they remain open and have a high fracture flow capacity.

The rate at which the acid reacts with the limestone, dolomite or other calcareous earth formation, is a function of acid concentration, temperature, velocity, the particular type of calcareous material or rock, and the rock surface area to acid volume ratio.

In well acidizing operations or fracturing processes utilizing an acid fracturing fluid, the acid can be pumped only so far into the well bore or earth formation before the acid becomes spent. The time required for the acid to be spent is generally referred to as the reaction time.

This reaction time is also the length of time that acid can be pumped into a formation through a 0.24 inch fracture or other predetermined size fracture before such acid becomes substantially spent. The distance reached in this period of time is the approximately maximum distance from the well bore that acid can be pumped or injected before becoming spent.

Even though the volume of the acid is increased two or even ten times, the volume of acid required to reach this maximum distance from the well bore, the reaction time will be the governing factor in determining the distance live acid will penetrate. If spent acid is pumped further into the formation, the fluid may cause the fracture to be extended, but it will not increase the flow capacity in the fracture and the fracture extension may close completely when the pressure is relieved.

Regular acid or non-retarded acid has a relatively short reaction time on pure limestone. The pumping time, in such acidizing or fracturing (acid free), will therefore be somewhat short since reaction time and pumping time are substantially the same.

The importance of extending this reaction time can readily be seen. Accordingly, it is the principal object of the present invention to provide a means of extending this reaction time.

Various approaches to this problem have been made in the prior art, and some are satisfactory for certain applications. One of the best methods prior to the instant invention utilizes an oil external emulsion. In such emulsion, hydrochloric acid or other acid is the internal phase and the oil is the external phase. In this approach, the oil separates the acid from the calcareous rock and until the emulsion breaks, the acid cannot react or spend on the formation. The stability of the emulsion determines the extent of the retardation of the acid. Emulsions are generally too stable at low temperatures and insufficiently stable at high temperatures.

Secondary emulsion problems often occur between the spent acid, oil in the emulsion and the formation fluids. Even the best of the emulsions known in the prior art have a high viscosity and are considerably more difficult to pump than a Newtonian fluid or a fluid containing friction reducing compounds.

Another disadvantage of the prior art emulsion systems, is that it takes a certain amount of time to prepare them and necessitates having storage facilities at the job location sufficiently large to handle the total volume of fluid to be pumped or injected into the well to be treated.

Gels also provide retardation of hydrochloric acid, and compounds such as guar gum, hydroxy ethyl cellulose, acrylamids and others have been used to gel acid and to interfere with the mobility of the hydrogen ions. The reaction between limestone and acid is diffusion controlled, at least for a portion of the reaction, so that the interference with mobility imparts a moderate amount of retardation of the acid.

As a gelled acid system of this type is disadvantageous in that breaking of the gel often depends on the presence of acid, and if the acid is spent too soon, the gel may never break. Special breakers are added to overcome this, but they are not lalways completely satisfactory.

Another disadvantage of gelled acid is that lumping of the gum or other gelling material frequently occurs when it is added to the acid.

It is therefore a primary object of the present invention to overcome these prior art disadvantages and to provide a well acidizing solution which has a low viscosity, i.e., one substantially the same as the viscosity of the acid solution without any additaments therein, and one in which the reaction time of the acid is delayed for a substantial period of time.

The composition and method designed to carry out the invention will be hereinafter described, together with other features thereof.

The invention will be more readily understood from a reading of the following specification and by reference to the accompanying drawings forming a part thereof, wherein an example of the invention is shown and wherein.

Figure 1:
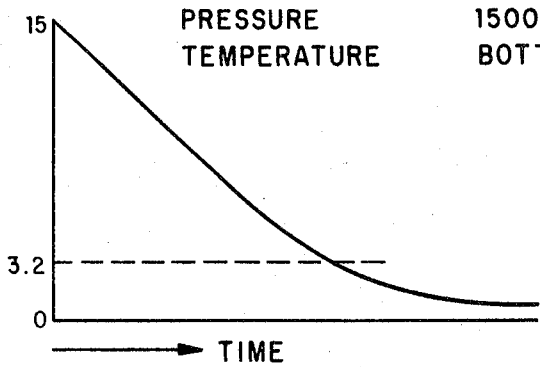
FIG. 1 is a graph illustrating reaction time of a 15% hydrochloric acid solution.

It has been discovered that a surface active agent which in the presence of acid renders calcareous formations substantially oil-wet, added to an acid in small amounts will considerably retard the reaction time of the acid.

For purposes of this application and to provide a means of standardization, Reaction Time is defined as the time required for the acid being tested to spend from its initial concentration (usually a 15% by weight hydrochloric acid) to spend to an acid concentration of 3.2%, at 1500 p.s.i., and with a surface area to volume ratio equivalent to that found in 0.24 inch fracture. Temperatures can be varied up to 350° F. or even higher, if desired, and fracture widths of various sizes may be simulated. The Reaciton Time is considered to be the maximum beneficial pumping time for acid in a fracture. The final acid concentration of 3.2% was chosen because in most formations this is the amount of acid required in a 0.24 inch fracture to give the theoretical minimum etching for the desired flow capacity.

Reaction times can be run at any surface area to volume ratio but the conditions of the test must be reported and considered in any comparison. The study of reaction times with different surface area to volume ratios showed that the reaction times are proportional to these ratios.

A saturated hydrocarbon sulfonate, having the general formula $$RSO_3X$$

with R being a $C_8$ to $C_{25}$ hydrocarbon chain and X being an alkali metal or ammonium has been found to be particularly satisfactory in retarding the reaction time of hydrochloric acid, acetic acid, and sulfamic acid. The sulfonate is made by treating a saturated hydrocarbon (aliphatic or cycloaliphatic) of some predetermined chain length with sulfur dioxide and chlorine in the presence of actinic light. Gamma radiation and certain catalysts can be substituted for the actinic light.

This forms a hydrocarbon sulfonyl chloride which is subsequently neutralized with an alkali meal hydroxide or ammonium hydroxide.

The preferred material is made by gassing a $C_{13}$ straight chain saturated hydrocarbon (aliphatic) to a specific gravity of .91 to .97 before neutralization.

U.S. Patent No. 2,999,812 illustrates a method of preparing surface active agents of this invention.

A surface active agent having the chemical formula $C_{13}H_{27}SO_3Na$ is very effective in retarding the reaction time of hydrochloric acid, acetic acid and sulfamic acid, when used in amounts of about 0.5% to about 2.5% by volume of acid. Optimum results are achieved with concentrations of about one percent of surface active agent by volume of acid.

In order for the present invention to be effective, oil must be present in the formation or specifically added thereto prior to treatment with the chemically retarded acid as a step of the acidizing procedure.

For the purpose of this application, the acid solution containing the unique surface active agent is referred to hereinafter as Chemically Retarded Acid or CRA. The surface active agent is referred to hereinafter as CRA–10.

Considerable laboratory tests have been made on this invention, and some of the more pertinent data is included herewith as follows:

TESTING PROCEDURES AND EVAULATION OF RESULTS

Re-emphasized research on these stimulation problems in the field of acidizing has resulted in the construction of specialized laboratory equipment and testing procedures to control the important variables such as rock surface areas to acid volume ratios, pressure, temperature and other factors in an attempt to more nearly simulate actual bottom hole conditions. This testing procedure involves placing a quantity of formation rock, which has been sized to give a surface area to volume ratio found in a 0.24" fracture, into an autoclave. The rock is heated to bottom hole temperature in the presence of formation oil. When the autoclave and rock reach the desired temperature, oil is displaced by a pre-determined amount of acid at a minimum pressure of 1500 p.s.i. When the acid is in the cell, it is allowed to react for a period of time. The acid is then sampled and titrated to determine the residual acid concentration. Other samples are taken at different times and an "Acid Concentration Versus Time" curve is plotted. In many instances, all the fluid in the autoclave will be removed, aliquots taken and analyzed. This requires that a number of filled autoclaves be run to obtain several points on a curve. The curve is plotted as shown in FIG. 1 showing "Percent Unreacted Acid versus Time." The length of time required for the acid to spend to 3.2% is considered to be the reaction time.

A simple descriptive term was necessary for comparing the retarding efficiency of the particular acid systems being tested. Reaction rate should not be used since the rate of reaction changes for each increment of the reaction. Average reaction rate could apply, however to prevent confusion between reaction rate and average reaction rate, the term "Reaction Time" was chosen. Reaction Time is defined as set forth hereinabove.

Figure 2:
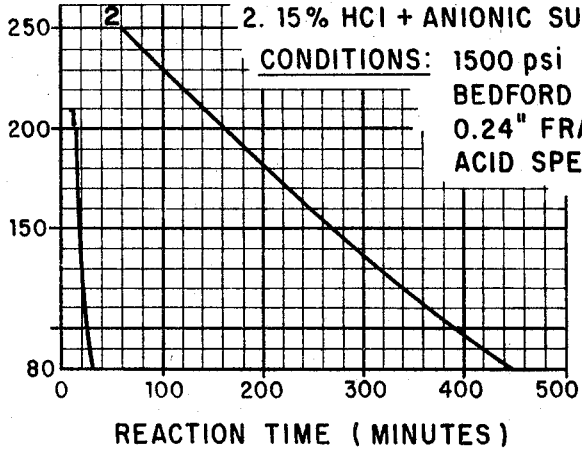
FIG. 2 is a graph illustrating the effect of temperature on Reaction Time of a 15% hydrochloric acid solution and a 15% hydrochloric acid solution with 1.0% by volume of an anionic surface active agent of the present invention added thereto.
Figure 3:
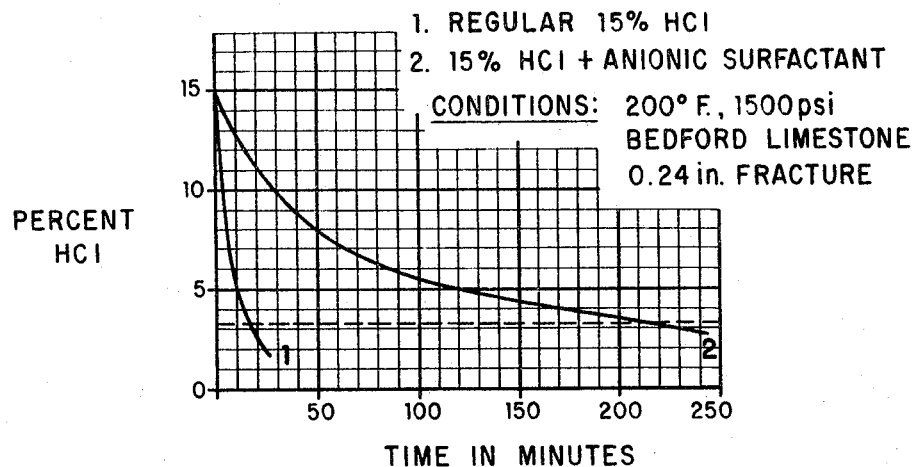
FIG. 3 is a graph illustrating the Reaction Time Curves of a 15% hydrochloric acid solution and a 15% hydrochloric acid solution with 1.0% by volume of an anionic surface active agent of the present invention added thereto.
Figure 4:
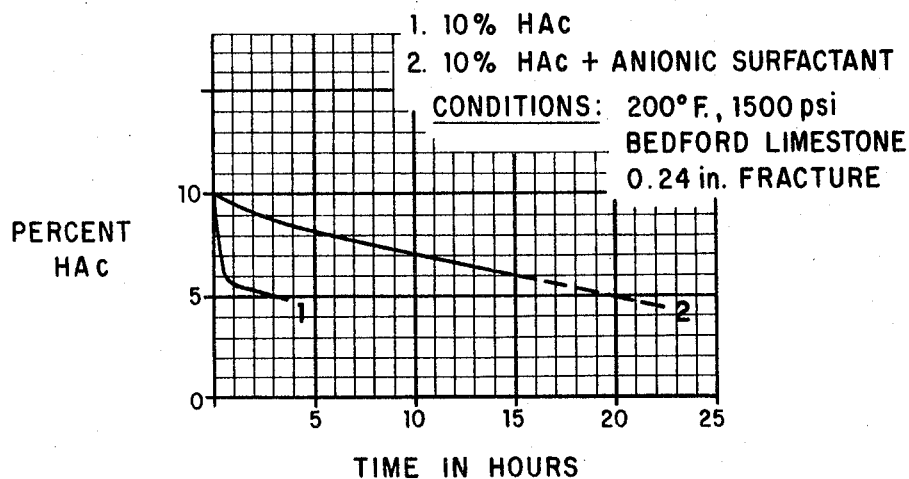
FIG. 4 is similar to FIG. 3, and illustrates the Reaction Time curves when the acid solution is 10% acetic acid.

FIGS. 2, 3 and 4 illustrate comparative data of Chemically Retarded Acid versus regular acid.

Table I hereinbelow illustrates a comparison of the chemically retarded acids and regular acid:

TABLE I.—REACTION TIMES FOR ACIDS— BEDFORD LIME

[0.24" fracture—1500 p.s.i. (time in minutes)]

| Type Acid | 80° F. | 150° F. | 200° F. | 250° F. |
|---|---|---|---|---|
| Regular [1] | 29 | 20 | 12 | |
| Gelled [2] | 45 | 26 | | |
| Emulsified [3] | 1–10 hrs | 1–6 hrs | 1–3 hrs | 60. |
| Chemically Ret.[4] | 1–8 hrs | 1–5 hrs | 1–3 hrs | 60. |
| Acetic Acid [5] | 5 hrs | 4 hrs | 3 hrs | 2 hrs. |

[1] 15% hydrochloric acid.
[2] 15% hydrochloric acid gelled with guar gum.
[3] An oil external emulsion containing 80% acid (15% hydrochloric acid) as the internal phase and 20% kerosene as the external phase, and emulsified with a cationic emulsifier. Although the reaction time of this type of retarded acid can be controlled, it has a very high viscosity when compared with regular or unretarded acid.
[4] 15% hydrochloric acid with 1.0% by volume CRA-10.
[5] 10% acetic acid.

Data are presented in Table II showing the effect of different surfactant types on the reaction of hydrochloric acid on limestone. The results are reported as a ratio of the reaction time of the hydrochloric acid-surfactant system to the reaction time of hydrochloric acid. The purpose of this data is to show the range of effectiveness of each surfactant type, and thus it does not include each individual surfactant tested.

The retarding effects of cationic surfactants do not appear to be as great as those of the anionic type. Based on expected adsorption of the surfactants on limestone, the order of decreasing retardation should be anionic >cationic>nonionic. Since the limestone does contain some siliceous impurities, one can expect some adsorption of cationics and nonionics.

If it is assumed that calcium carbonate possesses a positive surface charge when in the test solutions, then the negatively charged surfactant ions should be adsorbed on this surface to a greater extent and more strongly than other types of ions. The structure of the anionic molecule will influence its adsorption characteristics as will its solubility and stability in the adsorption medium. The larger molecules (e.g. bulky alkyl aryl sulfonates) give less retardation than the alkyl sulfonates. The alcohol sulfates are not stable in the acid solution and show less retarding effect.

It should be pointed out that the acid reaction experiments reflect more than just surfactant adsorption on the limestone. Since these experiments were run in the presence of oil, its possible effect should be considered.

When an anionic surfactant adsorbs on the solid surface, it will be oriented so that the non-polar hydrocarbon group is directed away from the surface. This results in a surface which is preferentially oil wettable. Hence, in the anionic experiments reported here, the limestone rock is undoubtedly oil wet. The possibility of some emulsification of oil and surfactant solution at the surface has been considered. Although some of the tested cationics and nonionics are believed to be good emulsion stabilizers in the acid-oil system, they show little retarding effect. Consequently, emulsification must be negligible.

TABLE II.—EFFECT OF SURFACTANTS ON ACID REACTION ON LIMESTONE

| Surfactant | Ratio of Reaction Time of HCl With Surfactant / Without Surfactant |
|---|---|
| Cationic: | |
|   $C_{12}$ Quaternary | 1.67 |
|   Complex Quaternary | 1.00 |
|   Do | 1.27 |
| Nonionic: | |
|   Ethoxylated Alcohol | 1.09 |
|   Acetylenic Poly Alcohol | 1.25 |
| Anionics: | |
|   Alkyl Phosphate | 9.00 |
|   Alkyl Sulfate | 1.43 |
|   Alkyl Sulfonate | 7.10 |
|   Alkyl Aryl Sulfonate Higher Molecular Weight | 2.82 |
|   Alkyl Aryl Sulfonate Lower Molecular Weight | 3.36 |
|   Alkyl Aryl Sulfonic Acid | 1.60 |
|   Alkyl Taurate | 5.26 |

Table III, hereinbelow is illustrative of the viscosities of CRA, regular 15% hydrochloric acid, 15% sulfamic acid, a gelled acid and an emulsified acid.

TABLE III.—PROCEDURE

The viscosities were measured at 600 r.p.m. at 78° F. using the fann viscometer utilizing the 25S spring which provides a range factor of ½ and a spring constant ($K_s$) of 193.5.

DATA

Solution: Reading
- 15% HCl _____ 4.5
- CRA _____ 4.5
- 15% sulfamic _____ 4.5
- Gelled acid _____ 102.0
- Emulsified acid _____ 218.0

Table IV hereinafter illustrates the results of Reaction Time tests conducted to determine the retarding efficiency of CRA-10 in sulfamic acid reacted with limestone.

TABLE IV.—PROCEDURE

Reaction time tests were conducted at 150° F., 1500 p.s.i., using Bedford limestone core plugs cut to simulate a 0.34 inch fracture. The cores were preheated in kerosene for 2 hours. One acid solution was 15% sulfamic containing 0.2% MSA inhibitor. The second solution was 15% sulfamic containing 0.2% MSA inhibitor and 1.0% CRA-10.

The reaction time listed in the data section of this report is the time required for the acid to react to a residual concentration of 3.2%.

DATA

| Solution | Percent CRA-10 | ° F. | Reaction Time, min. |
|---|---|---|---|
| 15% Sulfamic | 0.0 | 150 | 18 |
| Do | 1.0 | 150 | 36 |

NOTE.—The spent acid solution was free of precipitate. However, the core plug had a slight visible deposit on its surface, probably from the degradation of sulfamic acid to sulfuric acid and subsequent precipitation as calcium sulfate on the core.

Table V, hereinbelow illustrates the effect of various concentrations of CRA-10 in 15% hydrochloric acid solution.

TABLE VI

Conditions:
150° F., 1500 p.s.i.
Bennett's Chat (Limestone)
0.1 inch fracture (surface area to volume ratio equivalent to 8 sq. cm./cc.)
Initial concentration of HCl—15%.

| Percent CRA-10: | Percent residual HCl |
|---|---|
| 0.5 | 1.7 |
| 0.6 | 2.7 |
| 0.7 | 3.2 |
| 0.8 | 3.5 |
| 0.9 | 4.05 |
| 1.0 | 4.25 |
| 1.2 | 3.7 |
| 1.4 | 2.25 |
| 1.5 | 2.0 |
| 2.0 | 1.2 |
| 2.5 | 1.2 |

Table VI hereinbelow illustrates the effect of acid concentration on the retardation effect of CRA-10 in Reaction Time Ratio.

TABLE V

Conditions:
200° F., 1500 p.s.i.
Bedford Limestone
24 inch fracture
Acid spent to 3.2% concentration
Acid contained .3% corrosion inhibitor

| Percent Concentration of HCl | Percent Concentration of CRA-10 | Reaction Time Ratio |
|---|---|---|
| 10 | 0 | 1 |
| 10 | 1 | 23 |
| 15 | 0 | 1 |
| 15 | 1 | 9.7 |
| 20 | 0 | 1 |
| 20 | 1 | 2.6 |
| 25 | 0 | 1 |
| 25 | 1 | .82 |
| 25 | 2 | .76 |

The Chemically Retarded Acid of the present invention has been extensively field tested. An example of a successful well acidizing operation using 15% hydrochloric acid to which had been added 1.0% by volume of CRA-10 on a well in Miller County, Arkansas is as follows:

CONDITION

- Formation _____ Jeter
- BHT _____ ° F __ 168
- Perforations _____ ft __ 6185–6191

The well was closed in for one hour after the acid was pumped. The well was then opened and placed on a swab. Swabbing was started 40 minutes after the well was opened. Three runs were made. The well began to gas and it was placed on a ¼" choke. The well began to flow at 300 p.s.i. The well would load up with acid water and cease to flow. A run of the swab would start the well to flowing again.

The formation broke down at 2400 p.s.i. which was considered abnormally low. The injection pressure was 3750 p.s.i. at the injection rate of 5.5 b.p.m.

The well was shut in for one hour, then opened and placed on a swab. Swabbing started one hour and 40 minutes after the last acid was pumped. Three runs of the swab were made and acid gas began to return. The swab was removed and the well was allowed to gas 30 minutes before being placed on a ¼ inch choke. The well started flowing at 300 p.s.i. The well began to load up with acid water and the pressure dropped to 100 p.s.i. The first acid recovered was detected at 12:30, two hours and 40 minutes after the last acid was introduced into the formation. The well flowed intermittently. When the well died, one pull of the swab unloaded the well sufficiently for it to begin flowing again. At 2:00 p.m., 3 hours and 10 minutes after the well was opened up, 36.4 bbls. of fluid had been recovered.

DATA

| Sample No. | 1 | 2 | 3 | 4 | 5 |
|---|---|---|---|---|---|
| Time Acid Was in Formation, min. | 160 | 165 | 185 | 250 | 305 |
| Total Fluid Produced | | | 36.4 | | |
| HCl Content, Percent | 0.6 | 0.5 | 0.4 | 0.6 | 0.3 |
| pH | 0.1 | 0.3 | 0.25 | 0.1 | 1.9 |
| Sp. Gr. at 80° F. | 1.1801 | 1.1800 | 1.1807 | 1.1705 | |
| Cl | 248,000 | 158,000 | 160,000 | 152,000 | 163,000 |
| SO$_4$ | 540 | 700 | 680 | 700 | 440 |
| Ca | 99,250 | 74,500 | 76,250 | 69,500 | 83,000 |
| Mg | 10,350 | 2,100 | 2,400 | 2,700 | 900 |
| Total Fe | 2,230 | 2,350 | 1,930 | 1,970 | 2,040 |
| Surface Tension (dynes/cm.) | 39.0 | 38.0 | 39.3 | 41.3 | 43.4 |
| Interfacial Tension (dynes/cm.) | 0.0 | 0.0 | 0.0 | 0.0 | 0.0 |

Chemically Retarded Acid has made it possible to successfully treat formations in the Permian Basin that have a tendency to make considerable water when conventionally acidized. CRA was used at low injection rates and low injection pressures to aid in avoiding the acidization or fracturing into water. Because of CRA's extended reaction time with low viscosity and no solids, this manner of placement was feasible and efficient.

Other results of field tests are as follows:

A new West Texas well completed at about 9,000 ft. in a Pennsylvanian limestone having 95 percent solubility was treated with 16,000 gallons of CRA at a high injection rate. Laboratory tests on a core sample indicated a reaction time of 90 minutes would still leave a 3% residual live acid concentration. Samples of returned fluid obtained after 90 minutes of formation contact time showed the returned acid to be 2.4 percent live acid. Well tested 1½ barrels of oil per hour prior to treatment and 8 barrels oil per hour after treatment.

A programmed acid plan was prepared for a new well in Miller County, Arkansas. The limestone formation was perforated over a 6 foot interval at approximately 6,200 feet. The Chemically Retarded 15% Acid was designed for one hour reaction time at 168° F. using 7,000 gallons of acid solution. Injected at approximately 5.5 b.p.m., the acid was placed in 30 minutes. After 1 hour contact time, the well was reversed. The first fluid returns contained acid and oil free of emulsion. After 2 hours 40 minutes, the fluids still contained residual acid with no emulsion. One week after treatment well was capable of flowing 170 b.o.p.d. with no B.S. and W.

Kelly Bayou Field, Arkansas—81 percent limestone formation at approximately 6,140 feet treated with 8,000 gallons 15% CRA at 3,850 p.s.i. injection pressure at 6 b.p.m. and shut in for 1 hour. Well was completed and tested at 147 b.o.p.d. pumping as one of the best new wells in the field.

In Ector County, West Texas, a new well was drilled into Devonian and completed at selected intervals about 10,000 feet. Treated with 12,000 gallons Chemically Retarded Acid for maximum allowable. Well tested in excess of 300 b.o.p.d. and no water. Other comparable wells in the field were usually fractured on initial completion.

Ellenburg gas well completed several years ago in the Puckett Field, West Texas, was retreated with 5,000 gallons Chemically Retarded Acid. Declined production before treatment was 16MM c.f. per day with 1300 p.s.i. wellhead pressure. Production after treatment was 18MM c.f. per day with 1700 p.s.i. wellhead pressure.

The present invention relates broadly to a completely new and different approach to retarding acid reaction on limestone, dolomite and/or other calcareous formations. It provides for retardation without an increase in viscosity and without the addition of any solid material.

The mineral oil displaced ahead of the chemically retarded acid is preferably a relative low gravity oil.

The term Chemically Retarded Acid (CRA) shown in the laboratory tests and field tests hereinabove, unless otherwise specified, is a 15% hydrochloric acid solution to which has been added about one percent of a surface active agent having the formula $C_{13}H_{27}SO_3Na$ made as described hereinabove.

The foregoing disclosure and description of the invention is illustrative and explanatory thereof and variations of the materials and method may be made within the scope of the appended claims, without departing from the spirit of the invention.

What is claimed is:

1. A method of acidizing an oil containing calcareous formation with a well acidizing acid, wherein the reaction time of the acid acting on the formation is substantially increased, comprising the step of: contacting the oil containing calcareous formation with a well acidizing acid containing an anionic surface active agent which in the presence of said acid renders oil containing calcareous formations substantially oil-wet, and said surface active agent being present in an amount sufficient to substantially increase the reaction time of the acid acting on the formation.

2. The method of claim 1, wherein the surface active agent has the chemical formula $C_{13}H_{27}SO_3Na$.

3. The method of claim 1, wherein said surface active agent is a saturated hydrocarbon sulfonate having the general formula $RSO_3X$, wherein R is a $C_8$ to $C_{25}$ hydrocarbon chain and X is an alkali metal or ammonium, said sulfonate being made by: treating a saturated hydrocarbon selected from the group consisting of aliphatic and cycloaliphatic hydrocarbons of a predetermined chain length with sulfur dioxide and chlorine in the presence of actinic light, gamma radiation, or the like; the hydrocarbon sulfonyl chloride formed thereby is subsequently neutralized with a hydroxide selected from the group consisting of alkali metals and ammonium; and gassing the saturated hydrocarbons to a specific gravity of .91 to .97 before neutralization.

4. A method of acidizing subterranean calcareous formations traversed by a well bore, comprising: introducing into the well bore and into the calcareous formation a mineral oil, thereby flushing the calcareous formation and providing residual oil in the formation, introducing into the well bore a low viscosity acid solution containing a relatively small amount of an anionic surface active agent which in the presence of the acidizing solution and oil renders a calcareous formation oil-wet and which enables the acid solution to substantially retain its normal viscosity, and contacting the oil-containing calcareous formation with said acid containing said anionic surface active agent, whereby the calcareous formation is oil-wet and the reaction time of the acid solution on the calcareous formation is substantially increased thereby enabling a substantially greater penetration of the acid solution into the calcareous formation.

5. The method of claim 4, wherein said surface active agent is an alkyl aryl sulfonate.

6. The method of claim 4, wherein said surface active agent is an alkyl phosphate.

7. The method of claim 4, wherein said surface active agent is an alkyl taurate.

8. The method of claim 4, wherein said surface active agent is a saturated hydrocarbon sulfonate having the general formula $RSO_3X$, wherein R is a $C_8$ to $C_{25}$ hydrocarbon chain and X is an alkali metal or ammonium, said sulfonate being made by: treating a saturated hydrocarbon selected from the group consisting of aliphatic and cycloaliphatic hydrocarbons of a predetermined chain length with sulfur dioxide and chlorine in the presence of actinic light, gamma radiation, or the like; the hydrocarbon sulfonyl chloride formed thereby is subsequently neutralized with a hydroxide selected from the group consisting of alkali metals and ammonium; and gassing the saturated hydrocarbons to a specific gravity of .91 to .97 before neutralization.

9. A method of acidizing calcareous formations traversed by a well bore, comprising the steps of:
   (a) preflushing the calcareous formation to be treated with a mineral oil, if the calcareous formation is free of the presence of oil;
   (b) introducing into a low viscosity well acidizing solution selected from the group of acids consisting of hydrochloric acid, acetic acid, sulfamic acid and mixtures thereof, from about 0.5% to about 2.5% by volume of acid solution of an anionic surface active agent which in the presence of the acid solution renders calcareous formations oil-wet, whereby the viscosity of the acid solution is substantially unchanged; and
   (c) introducing into the well bore, the low viscosity well acidizing solution containing the surface agent and contacting the calcareous formation to be acidized, whereby the reaction time of the acid is substantially increased, thereby providing a substantially greater penetration of the active acid solution into the calcareous formation than can be achieved with the same acidizing solution without the surface active agent added thereto.

10. The method of claim 9, wherein the well acidizing acid is a 15% hydrocholoric acid solution, and the surface active agent is selected from the group of anionic surface active agents consisting of alkyl phosphates, alkyl sulfonates, alkyl aryl sulfonates, alkyl sulfates, alkyl aryl sulfonic acids and alkyl taurates.

11. The method of claim 9, wherein said surface active agent is a compound having the formula $C_{13}H_{27}SO_3Na$.

12. The method of claim 9, wherein said surface active agent is a compound having the general formula $RSO_3X$ wherein R is a $C_8$ to $C_{25}$ saturated hydrocarbon chain and X is a compound selected from the group consisting of alkali metals and ammonium, said compound being made by: treating a saturated hydrocarbon selected from the group consisting of aliphatic and cycloaliphatic hydrocarbons of a predetermined chain length with sulfur dioxide and chlorine in the presence of actinic light, gamma radiation, or the like; the hydrocarbon sulfonyl chloride formed thereby is subsequently neutralized with a hydroxide selected from the group consisting of alkali metals and ammonium; and gassing the saturated hydrocarbons to a specific gravity of .91 to .97 before neutralization.

13. A method of chemically retarding the reaction time of acid solutions on calcareous formations, comprising the steps of:
   (a) adding to the acid solution a relatively small amount of an alkyl phosphate which in the presence of said acid renders calcareous formations substantially oil-wet; and
   (b) contacting the calcareous formation to be acidized with the acid solution containing the alkyl phosphate, whereby the reaction time of the acid acting on the calcareous formation is substantially increased.

14. A method of chemically retarding the reaction time of acid solutions on calcareous formations, comprising the steps of:
   (a) adding to the acid solution a relatively small amount of an alkyl taurate which in the presence of said acid renders calcareous formations substantially oil-wet; and
   (b) contacting the calcareous formation to be acidized with the acid solution containing the alkyl taurate, whereby the reaction time of the acid acting on the calcareous formation is substantially increased.

15. A method of chemically retarding the reaction time of acid solutions on calcareous formations, comprising the steps of:
   (a) adding to the acid solution a relatively small amount of an alkyl aryl sulfonate which in the presence of said acid renders calcareous formations substantially oil-wet; and
   (b) contacting the calcareous formation to be acidized with the acid solution containing the alkyl aryl sulfonate, whereby the reaction time of the acid acting on the calcareous formation is substantially increased.

References Cited by the Examiner

UNITED STATES PATENTS

| | | | |
|---|---|---|---|
| 2,717,011 | 8/1939 | Shelley | 252—8.55 |
| 2,217,676 | 10/1940 | Fry | 252—8.55 |
| 2,265,759 | 12/1941 | Lawton et al. | 252—8.55 |
| 2,370,421 | 2/1945 | Reed | 252—8.55 |
| 2,717,876 | 9/1955 | Menaul | 252—8.55 |
| 2,782,859 | 2/1957 | Garst | 166—42 |
| 2,803,306 | 8/1957 | Hower | 252—8.55 |
| 2,999,812 | 9/1961 | Krahler | 252—8.55 |
| 3,042,610 | 7/1962 | Dunlap | 252—8.55 |
| 3,122,204 | 2/1964 | Oakes | 252—8.55 |
| 3,254,718 | 6/1966 | Dunlap | 166—42 |

OTHER REFERENCES

Gryzen, "Retarded Acid is Successful in Alberta," World Oil, March 1957, pages 154, 156 and 158.

CHARLES E. O'CONNELL, *Primary Examiner.*

S. J. NOVOSAD, *Assistant Examiner.*